(12) United States Patent
Zhou et al.

(10) Patent No.: US 7,632,775 B2
(45) Date of Patent: Dec. 15, 2009

(54) MULTICOMPONENT NANOPARTICLES FORMED USING A DISPERSING AGENT

(75) Inventors: Bing Zhou, Cranbury, NJ (US); Sukesh Parasher, Lawrenceville, NJ (US); Michael Rueter, Plymouth Meeting, PA (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 742 days.

(21) Appl. No.: 10/990,616

(22) Filed: Nov. 17, 2004

(65) Prior Publication Data

US 2006/0116286 A1    Jun. 1, 2006

(51) Int. Cl.
*B01J 25/00* (2006.01)
*B01J 23/40* (2006.01)
*B01J 23/42* (2006.01)
*C22C 38/00* (2006.01)
*C22C 5/04* (2006.01)
*B01J 31/00* (2006.01)

(52) U.S. Cl. ................ 502/300; 502/326; 502/167; 502/168; 502/172; 502/173; 977/810; 420/82; 420/466

(58) Field of Classification Search .......... 502/300–355, 502/167, 168, 172, 173; 977/701, 777, 810; 420/8–127, 400–589
See application file for complete search history.

(56) References Cited

U.S. PATENT DOCUMENTS

| | | |
|---|---|---|
| 3,625,879 A | 12/1971 | Horne et al |
| 3,644,200 A | 2/1972 | Young |
| 3,674,706 A | 7/1972 | Box, Jr. et al. |
| 3,686,340 A | 8/1972 | Patrick et al. |
| 3,700,745 A | 10/1972 | Kovach et al. |
| 4,007,256 A | 2/1977 | Kim et al. |
| 4,028,274 A | 6/1977 | Kunz |
| 4,053,531 A | 10/1977 | Kerr et al. |
| 4,064,154 A | 12/1977 | Chandra et al. |
| 4,083,803 A | 4/1978 | Oswald et al. |
| 4,128,627 A | 12/1978 | Dyer et al. |
| 4,148,750 A | 4/1979 | Pine |
| 4,157,355 A | 6/1979 | Addison |
| 4,247,730 A | 1/1981 | Brunelle |
| 4,279,883 A | 7/1981 | Izumi et al. |
| 4,297,205 A | 10/1981 | Mieville |
| 4,335,092 A | 6/1982 | Dalton et al. |
| 4,336,239 A | 6/1982 | Dalton et al. |
| 4,336,240 A | 6/1982 | Moseley et al. |
| 4,347,231 A | 8/1982 | Michaelson |
| 4,347,232 A | 8/1982 | Michaelson |
| 4,366,085 A | 12/1982 | Ikegami et al. |
| 4,379,778 A | 4/1983 | Dalton Jr. et al. |
| 4,454,240 A | 6/1984 | Ganguli |
| 4,476,242 A | 10/1984 | Puskas et al. |
| 4,503,160 A | 3/1985 | Williams |
| 4,513,098 A | 4/1985 | Tsao |
| 4,595,666 A | 6/1986 | Ganguli |
| 4,701,428 A | 10/1987 | Bellussi et al. |
| 4,713,363 A | 12/1987 | Hucul |
| 4,793,980 A | 12/1988 | Torobin |
| 4,824,976 A | 4/1989 | Clerici et al. |
| 4,826,795 A | 5/1989 | Kitson et al. |
| 4,832,821 A | 5/1989 | Swan, III |
| 4,832,938 A | 5/1989 | Gosser et al. |
| 4,937,216 A | 6/1990 | Clerici et al. |
| 4,937,220 A | 6/1990 | Nickols, Jr. |
| 4,983,558 A | 1/1991 | Born et al. |
| 4,999,326 A | 3/1991 | Sikkenga et al. |
| 5,017,535 A | 5/1991 | Schoonhoven et al. |
| 5,024,905 A | 6/1991 | Itoh et al. |
| 5,061,671 A | 10/1991 | Kitson et al. |

(Continued)

FOREIGN PATENT DOCUMENTS

EP    0 864 362    9/1998

(Continued)

OTHER PUBLICATIONS

Nashner et al. "Structural Characterization of Carbon-Supported Platinum-Ruthenium Nanoparticles from the Molecular cluster Precursor PtRu5C(CO)16" Journal of the American Chemical Society, 1997, 119, 7760-7771.*

(Continued)

*Primary Examiner*—Steven Bos
*Assistant Examiner*—Anthony J Zimmer
(74) *Attorney, Agent, or Firm*—Workman Nydegger

(57) ABSTRACT

Disclosed are nanoparticles formed from a plurality of two or more different components. The two or more components are dispersed using a dispersing agent such that the nanoparticles have a substantially uniform distribution of the two or more components. The dispersing agents can be poly functional small organic molecules, polymers, or oligomers, or salts of these. The molecules of the dispersing agent bind to the particle atoms to overcome like-component attractions, thereby allowing different and/or dissimilar components to form heterogeneous nanoparticles. In one embodiment, dissimilar components such as iron and platinum are complexed using the dispersing agent to form substantially uniform heterogeneous nanoparticles. Methods are also disclosed for making the multicomponent nanoparticles. The methods include forming suspensions of two or more components complexed with the dispersing agent molecules. The suspensions can also be deposited on a support material and/or anchored to the support.

20 Claims, No Drawings

U.S. PATENT DOCUMENTS

| | | |
|---|---|---|
| 5,096,866 A | 3/1992 | Itoh et al. |
| 5,104,635 A | 4/1992 | Kanada et al. |
| 5,128,114 A | 7/1992 | Schwartz |
| 5,132,099 A | 7/1992 | Hiramatsu et al. |
| 5,132,480 A | 7/1992 | Tsutsui et al. |
| 5,166,372 A | 11/1992 | Crocco et al. |
| 5,180,573 A | 1/1993 | Hiramatsu et al. |
| 5,188,996 A | 2/1993 | Huang et al. |
| 5,214,168 A | 5/1993 | Zajacek et al. |
| 5,234,584 A | 8/1993 | Birbara et al. |
| 5,236,692 A | 8/1993 | Nagashima et al. |
| 5,320,821 A | 6/1994 | Nagashima et al. |
| 5,338,531 A | 8/1994 | Chuang et al. |
| 5,352,645 A | 10/1994 | Schwartz |
| 5,372,981 A | 12/1994 | Witherspoon |
| 5,378,450 A | 1/1995 | Tomita et al. |
| 5,391,531 A | 2/1995 | Ward |
| 5,399,344 A | 3/1995 | Yang et al. |
| 5,480,629 A | 1/1996 | Thompson et al. |
| 5,496,532 A | 3/1996 | Monzen et al. |
| 5,505,921 A | 4/1996 | Luckoff et al. |
| 5,583,085 A | 12/1996 | Ward |
| 5,698,488 A | 12/1997 | Birbara et al. |
| 5,767,036 A | 6/1998 | Freund et al. |
| 5,846,895 A | 12/1998 | Gila et al. |
| 5,846,898 A | 12/1998 | Chuang et al. |
| 5,851,948 A | 12/1998 | Chuang et al. |
| 5,859,265 A | 1/1999 | Muller et al. |
| 5,866,500 A | 2/1999 | Taguchi et al. |
| 5,885,443 A | 3/1999 | Bogdan et al. |
| 5,900,386 A | 5/1999 | Freund et al. |
| 5,912,367 A | 6/1999 | Chang |
| 5,925,588 A | 7/1999 | Chuang et al. |
| 5,961,948 A | 10/1999 | Wanngard |
| 5,965,101 A | 10/1999 | Goto et al. |
| 5,972,305 A | 10/1999 | Park et al. |
| 5,976,486 A | 11/1999 | Thompson et al. |
| 6,001,762 A | 12/1999 | Harmer et al. |
| 6,005,155 A | 12/1999 | Sun |
| 6,040,490 A | 3/2000 | Icioka et al. |
| 6,054,507 A | 4/2000 | Funaki et al. |
| 6,069,286 A | 5/2000 | Wu et al. |
| 6,090,858 A | 7/2000 | El-Sayed |
| 6,106,797 A | 8/2000 | Muller et al. |
| 6,127,307 A | 10/2000 | Muller et al. |
| 6,159,267 A | 12/2000 | Hampden-Smith et al. |
| 6,168,775 B1 | 1/2001 | Zhou et al. |
| 6,194,338 B1 | 2/2001 | Andolfatto et al. |
| 6,239,054 B1 | 5/2001 | Skukis et al. |
| 6,284,213 B1 | 9/2001 | Paparatto et al. |
| 6,331,500 B1 | 12/2001 | Tsuji et al. |
| 6,387,346 B1 | 5/2002 | Bertsch-Frank et al. |
| 6,447,743 B1 | 9/2002 | Devic et al. |
| 6,500,968 B2 | 12/2002 | Zhou et al. |
| 6,500,969 B1 | 12/2002 | Zhou et al. |
| 6,518,217 B2 | 2/2003 | Xing et al. |
| 6,528,683 B1 | 3/2003 | Heidemann et al. |
| 6,534,440 B2 | 3/2003 | Choudhary et al. |
| 6,534,661 B1 | 3/2003 | Zhou et al. |
| 6,551,960 B1 | 4/2003 | Laine et al. |
| 6,576,214 B2 | 6/2003 | Zhou et al. |
| 6,630,118 B2 | 10/2003 | Paparatto et al. |
| 6,635,348 B1 | 10/2003 | Hampden-Smith et al. |
| 6,649,140 B2 | 11/2003 | Paparatto et al. |
| 6,676,919 B1 | 1/2004 | Fischer et al. |
| 6,713,036 B1 | 3/2004 | Vanden Bussche et al. |
| 6,727,309 B1 | 4/2004 | Paiva et al. ............... 524/438 |
| 6,740,615 B2 | 5/2004 | Zhou |
| 6,746,597 B2 | 6/2004 | Zhou et al. |
| 6,776,606 B2 | 8/2004 | Haskew .................. 431/2 |
| 6,782,892 B2 | 8/2004 | Li et al. |
| 6,888,013 B2 | 5/2005 | Paparato et al. |
| 7,011,807 B2 | 3/2006 | Zhou et al. |
| 7,045,479 B2 | 5/2006 | Zhou et al. |
| 7,045,481 B1 | 5/2006 | Parasher et al. |
| 7,381,239 B2 * | 6/2008 | Waki et al. ..................... 75/255 |
| 2001/0024634 A1 | 9/2001 | Bertsch-Frank et al. |
| 2002/0022672 A1 | 2/2002 | Thunhorst et al. .......... 521/50.5 |
| 2003/0010252 A1 * | 1/2003 | Arita et al. ............... 106/31.27 |
| 2003/0012686 A1 | 1/2003 | Andresen et al. ............. 422/14 |
| 2003/0086853 A1 | 5/2003 | Devic |
| 2003/0104936 A1 | 6/2003 | Mao et al. |
| 2003/0121364 A1 * | 7/2003 | Sun ............................ 75/362 |
| 2003/0215383 A1 | 11/2003 | Escrig et al. |
| 2004/0013601 A1 | 1/2004 | Butz et al. |
| 2004/0037769 A1 | 2/2004 | Paparatto et al. |
| 2004/0037770 A1 | 2/2004 | Fischer et al. |
| 2004/0081611 A1 | 4/2004 | Muller et al. |
| 2004/0087441 A1 | 5/2004 | Bock et al. |
| 2004/0102648 A1 | 5/2004 | Borgmeier et al. |
| 2004/0151659 A1 | 8/2004 | Paparatto et al. |
| 2004/0151660 A1 | 8/2004 | Paparatto et al. |
| 2004/0184983 A1 | 9/2004 | Paparatto et al. |
| 2004/0241502 A1 | 12/2004 | Chung et al. |
| 2005/0014636 A1 | 1/2005 | Zhou et al. |
| 2006/0102521 A1 | 5/2006 | Zhou et al. |
| 2006/0243641 A1 | 11/2006 | Zhou et al. |
| 2008/0045401 A1 | 2/2008 | Zhou et al. |

FOREIGN PATENT DOCUMENTS

| | | |
|---|---|---|
| EP | 0 978 316 | 2/2000 |
| EP | 1 277 701 | 7/2002 |
| EP | 1 344 747 | 9/2003 |
| JP | 07069605 | 3/1995 |
| JP | 10324507 | 12/1998 |
| JP | 2003024794 | 1/2003 |
| WO | WO 98/10863 | 3/1998 |
| WO | WO 00/59635 | 10/2000 |
| WO | WO 01/05501 | 1/2001 |
| WO | WO 02/14217 | 2/2002 |
| WO | WO 02/083550 | 10/2002 |
| WO | WO 02/092501 | 11/2002 |
| WO | WO 02/92502 | 11/2002 |
| WO | WO 03/014014 | 2/2003 |
| WO | WO 2006/078352 | 7/2006 |

OTHER PUBLICATIONS

Sun et al. "Monodisperse FePt Nanoparticles and Ferromagnetic FePt Nanocrystal Superlattices", Mar. 17, 2000, Science, vol. 287, pp. 1989-1992.*

Bönnemann et al. "Nanoscale colloidal metals and alloys stabilized by solvents and surfactants Preparation and use as catalyst precursors", Journal of Organometallic Chemistry 520 (1996) 143-162.*

Kim et al. "Preparation and characterization of Au—Ag and Au—Cu alloy nanopartices in chloroform", Journal of Materials Chemistry, 2003, 13, 1789-1792.*

"Shape-Controlled Synthesis of Colloidal Platinum Nanoparticles" by T. Ahmadi et al, Science, vol. 272, Jun. 28, 1996, pp. 1924-1926.

Li, et al, "Preparation and Characterization of Multiwalled Carbon Nanotube-Supported Platinum for Cathode Catalysts of Direct Methanol Fuel Cells", *J. Phys. Chem*, B, Jun. 6, 2003, vol. 107, pp. 6292-6299.

Li, et al., "Carbon nanotubes as support for cathode catalyst of a direct methanol fuel cell", *Letters to the Editor/Carbon 40* Dalian University of Technology, (2002), pp. 787-803.

Lordi, et al., "Method for Supporting Platinum on Single-Walled Carbon Nanotubes for a Selective hydrogenation Catalyst", *Chem. Mater.* 2001, vol. 13, pp. 733-737.

Zhou et al, "Novel synthesis of highly active Pt/C cathode electrocatalyst for direct methanol fuel cell", *Chem. Commun.*, Jan. 13, 2003, (3), pp. 394-395.

Zhou, et al., "Preparation and Characterization of Anode Catalysts PtRu/C for Direct Methanol Fuel Cells", *Chemical Journal of Chinese Universities*, vol. 24, No. 5, pp. 858-862.

Scott et al., "Interaction between ruthenium and molybdenum in RuMo/Al$_2$O$_3$ catalysts", Applied Catalysis A: General 125 (1995) 71-79.

Adesina, "Hydrocarbon synthesis via Fischer-Tropsch reaction: travails and triumphs", Applied Catalysis A: General 138 (1996) 345-367.

Aksoylu et al., "Interaction between nickel and molybdenum in Ni—Mo/Al$_2$O$_3$ catalysts: II CO hydrogenation", Applied Catalysis A: General 168 (1998) 399-407.

Aksoylu et al., "Interaction between nickel and molybdenumin Ni-Mo/Al$_2$O$_3$ catalysts: III. Effect of impregnation strategy", Applied Catalysis A: General 183 (1999) 357-364.

Zhu et al., "Catalytic partial oxidation of methane to synthesis gas over Ni-CeO$_2$", Applied Catalysis A: General 208 (2001) 403-417.

Morioka et al., "Partial oxidation of methane to synthesis gas over supported Ni catalysts prepared from Ni— Ca/Al-layered double hydroxide", Applied Catalysis A: General 215 (2001) 11-19.

Chu et al., "The partial oxidation of methane to syngas over the nickel-modified hexaaluminate catalysts BaNi$_y$Al$_{12-y}$O$_{19-\delta}$", Applied Catalysis A: General 235 (2002) 39-45.

Basile et al., "Rh—Ni synergy in the catalytic partial oxidation of methane: surface phenomena and catalyst stability", Catalysis Today 77 (2002) 215-223.

Te et al., "Comparative study of Rh/Al$_2$O$_3$ and Rh—Mo/Al$_2$O$_3$ catalysts", Center for Catalytic Science and Technology, Abstract, Oct. 4, 1994.

Lowenthal et al., "Surface Chemistry of Rh-Mo/$\gamma$-Al$_2$O$_3$: An Analysis of Surface Acidity," Journal of Catalysis 156, 96-105 (1995).

Ahmadi et al., "Shape-Controlled Synthesis of Colloidal Platinum Nanoparticles", Science, vol. 272, Jun. 28, 1996, pp. 1924-1926.

Li et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).

Zhou et al., "Novel Synthesis of Highly Active Pt/C Cathode Electrocatalyst for Direct Methanol Fuel Cell", Chem. Commun. 2003, pp. 394-395.

Zhou et al., "Preparation and Characterization of anode catalysts Pt/Ru/C for Direct Methanol Fuel Cells", Chemical Journal of Chinese Universities, vol. 24, 2003, pp. 858-862.

Office Action dated Aug. 8, 2007 cited in U.S. Appl. No. 11/435,165.
Office Action dated Jan. 9, 2008 cited in U.S. Appl. No. 11/435,165.
Office Action dated Feb. 6, 2008 cited in U.S. Appl. No. 11/435,165.
Office Action dated May 30, 2008 cited in U.S. Appl. No. 11/435,165.
Office Action dated Mar. 27, 2008 cited in U.S. Appl. No. 11/103,676.
Office Action dated Aug. 13, 2008 cited in U.S. Appl. No. 11/103,676.
Office Action dated Mar. 21, 2008 cited in U.S. Appl. No. 11/101,241.
Office Action dated Aug. 19, 2008 cited in U.S. Appl. No. 11/101,241.
Office Action dated Jun. 24, 2008 cited in U.S. Appl. No. 11/435,580.
Search Report from PCT/US05/42841.

Li et al., "Preparation and Characterization of Multi-Walled Carbon Nanotube-Supported Platinum for Cathode Catalysts of Direct Methanol Fuel Cells", J. Phys. Chem., B, vol. 107, pp. 6292-6299 (Jun. 6, 2003).

Lordi et al., "Method for Supporting Platinum on Single-Walled Carbon Nanotubes for a Selective Hydrogenation Catalyst", Chem. Mater., vol. 13, pp. 733-737 (Feb. 10, 2001).

Office Action dated Feb. 2, 2009 cited in U.S. Appl. No. 11/435,165.
Office Action dated Dec. 5, 2008 cited in U.S. Appl. No. 11/103,676.
Office Action dated Jan. 9, 2009 cited in U.S. Appl. No. 11/101,241.
Notice of Allowance dated Apr. 10, 2009 in U.S. Appl. No. 11/101,241.
Notice of Allowance dated Jan. 30, 2009 in U.S. Appl. No. 11/435,580.

Zhou, et al., "Preparation and Characterization of Anode Catalysts PtRu/C for Direct Methanol Fuel Cells", *Chemical Journal of Chinese Universities*, vol. 24, No. 5, pp. 858-862, 2003.

* cited by examiner

MULTICOMPONENT NANOPARTICLES FORMED USING A DISPERSING AGENT

BACKGROUND OF THE INVENTION

1. The Field of the Invention

The present invention relates to forming multicomponent nanoparticles. In particular, the present invention relates to controlling the dispersion of two or more components to make nanoparticles where two or more different components are desirably distributed within the nanoparticles.

2. The Relevant Technology

Nanoparticles are becoming increasingly more important in many industrial processes and products. Nanoparticles find use in a variety of applications, including catalysis and nanomaterials. Catalytic applications include uses for both supported and unsupported nanoparticles of various components, including precious metals, base metals, and oxides. Nanomaterials applications include uses for light blocking, pigmentation, UV absorption, antimicrobial activity, chemical mechanical polishing, and others.

While useful nanoparticles may at times include only a single component (element or compound), it is often the case that advantageous properties can be achieved when the nanoparticles contain two or more distinct components to form a multicomponent particle. Combinations of two or more metals can have a variety of beneficial effects. In the case of catalysts, they can modify the catalytic activity to improve an important performance parameter such as activity or selectivity, or they may make the catalytic nanoparticle more resistant to some deleterious effect such as chemical poisoning or mechanical attrition. In the case of nanomaterials, the inclusion of two or more components can add additional functionality to the particles, such as combining light blocking function with UV absorption or anti-microbial activity. Alternatively, additional components may stabilize or strengthen the nanoparticles.

While there is a strong motivation for producing multicomponent nanoparticles, it is often difficult to create uniform compositions containing two or more unlike components. This problem is particularly true of nanoparticles. Recently, academia and industry have made significant advancements toward making very small particles. In some cases, the sizes of the particles are near or below 1 nanometer.

While nanometer sized particles are very advantageous for producing desired properties such as increased catalytic activity and unique material properties, small particle sizes can make it very difficult to create multicomponent nanoparticles. One reason for this difficulty is because similar or like elements or compounds have a greater affinity to combine and form particles with themselves, rather than mixing with other components. This leads to the tendency for multicomponent mixtures to result in the formation of two or more distinct particle compositions, some relatively rich in certain components, others relatively depleted or devoid of one or more components.

Particles are typically formed according to the thermodynamics between the two or more components. The chance of finding both components of a multicomponent particle in a single particle depends on the size of the particles. Where the particles are relatively large, the probability is higher that two dissimilar components can be compounded within a single particle and/or form an alloy. As the size of the particles decreases, however, the chance of finding both components within a single particle decreases dramatically. At the nanometer scale, it is virtually impossible to compound two or more dissimilar elements using known procedures. Particles tend to be all of one component or another.

Part of the problem with forming multicomponent nano-sized particles is that most methods used to form nano-sized particles are performed at relatively low temperatures since high temperatures causes nanoparticles to sinter or agglomerate to form larger particles. Unfortunately, at such low temperatures, the thermodynamics of nanoparticle formation favors formation of single-component particles as described above. Consequently, conventional particle formation methods are not able to form nano-sized particles containing two or more components that are uniformly distributed in each particle.

Another factor that significantly affects the uniformity of multicomponent particles is the dissimilarity of the components. For example, two noble metals such as palladium and platinum are typically more easily combined together within particles because their electronic and chemical properties are similar. In contrast, a noble metal such as platinum and a base metal such as iron have different electronic and chemical properties and are thus much more difficult to compound. In many cases, compounding dissimilar components does not produce a viable nanoparticle because of the lack of uniformity in the distribution of the components. This is particularly true for catalyst nanoparticles that require alloying to generate a desired catalytic performance.

Therefore, what are needed are multicomponent nanoparticles where different nanoparticle components are more evenly dispersed between the particles. Furthermore, what is needed is a process that can compound the different components together without destroying the nanometer size of the particles.

BRIEF SUMMARY OF THE INVENTION

The present invention relates to particle compositions that overcome the limitations of the prior art by providing "nano" sized particles that are composed of two or more components in a desired distribution. A dispersing agent binds the two or more components to control the arrangement of the components in the nanoparticle material.

In an exemplary embodiment, the multicomponent compositions of the present invention include a plurality of nanoparticles having a size less than about 100 nm. The plurality of nanoparticles includes at least two dissimilar nanoparticle components. The nanoparticle components are selected from different members of the group of noble metals, base transition metals, alkali earth metals, rare earth metals, and non-metals, as well as the oxides of the above. In a preferred embodiment, at least about 50% of the nanoparticles include two or more dissimilar components. More preferably, at least about 75% of the nanoparticles include two or more dissimilar components, even more preferably at least about 85% of the nanoparticles include two or more dissimilar components, and most preferably at least about 95% of the nanoparticles include two or more dissimilar components. It is within the scope of the invention for at least about 99% of the nanoparticles to include two or more dissimilar components.

The components that form the nanoparticles can be elements or compounds such as elemental metals or metal oxides. In an alternative embodiment, the muiticomponent composition is made from two dissimilar nanoparticle components selected from different groups of the periodic table of elements.

The present invention also includes a method to produce the uniform multicomponent nanoparticles. In one embodiment, the process of the present invention includes preparing first and second solutions of dissimilar components. The solutions of dissimilar components are mixed together with a dispersing agent to form a suspension of nanoparticles. The molecules of the dispersing agent bind to at least a portion of the molecules of the first and second components to sufficiently overcome the like-component attractions such that the components can be arranged randomly or according to the molecular arrangement of the dispersing agent within the suspension.

In one embodiment, the suspension of nanoparticles can be used as an active catalyst in the suspension form. Alternatively, the nanoparticles can be attached to a solid support by a suitable impregnation or attachment method. The nanoparticles can also be separated from some or all of the liquid to form a concentrate of nanoparticles or a dry powder. As needed, the suspension can be chemically modified to stabilize the nanoparticles (e.g., prevent agglomeration), adjust pH, or otherwise adjust composition to suit an end use application.

In an exemplary embodiment, the nanoparticles of the present invention are also of a substantially uniform size such that the particle size distribution is extremely small. The substantially uniform particle size distribution produces a nanoparticle material with more consistent properties and activity throughout the material.

The nanoparticles and methods of the present invention provide many advantages for making novel nanomaterials such as catalysts and/or for improving the activity and performance of existing nanomaterials. Novel nanomaterials are possible because dissimilar components, which typically do not form uniform particles, can be dispersed using one or more dispersing agents such that most or all of the particles have the two or more components in each particle. Because each nanoparticle contains a mixture or alloy of the two or more components, each nanoparticle has the intended or desired characteristic needed to produce the properties of the multicomponent material.

Unlike the nanoparticles of the prior art, the dissimilar components in the nanoparticles of the present invention are evenly dispersed among the nanoparticles. The dispersing agent overcomes the tendency for like components to agglomerate and form homogeneous particles, thereby forming heterogeneous particles. In many cases, the functionality of the material depends on forming heterogeneous particles rather than forming a heterogeneous mixture of homogeneous particles, as is typically seen in the prior art. The proper dispersing and mixing of the two or more components according to the present invention imparts beneficial characteristics, such as those described above.

Another advantage of the present invention is that the dispersing agents are readily available and relatively inexpensive. Still another advantage of the invention is that it is highly flexible in that it works well with a variety of components and thus can be used to improve many new and existing catalysts and nanomaterials. Furthermore, existing and novel catalysts can be stabilized thereby providing opportunities to use the nanoparticles in new processes or improve the nanoparticles resistance to degradation.

These and other advantages and features of the present invention will become more fully apparent from the following description and appended claims as set forth hereinafter.

DETAILED DESCRIPTION OF EXEMPLARY EMBODIMENTS

I. Introduction and Definitions

The present invention is directed to nanoparticle materials made from two or more different components. The multicomponent nanoparticles are formed using a dispersing agent. In an exemplary embodiment, the dispersing agent binds to the components and determines in part the molecular arrangement of the components. The dispersing agent is able to ensure that the two or more different components are distributed between nanoparticles in a desired distribution. These nanoparticles form catalysts with improved and/or novel catalytic activity and also form nanomaterials with superior properties.

For purposes of this invention, the term "nanoparticles" or "nano-sized particles," means particles with a diameter of less than about 100 nanometers (nm).

The term "component complex" refers to a solution, colloid, or suspension in which a bond or coordination complex is formed between a dispersing agent and one or more different types of particle atoms. The "bond" between the control agent and particle atoms can be ionic, covalent, electrostatic, or it can involve other bonding forces such as coordination with nonbonding electrons, van der Waals forces, and the like.

The term "minority component" means the component in the multicomponent nanoparticle with the lesser % composition. In the case where two or more components have essentially the same % composition, evidenced by the fact that the determination of a minority is statistically impractical, then either component is considered to be the minority component.

For purposes of this invention, the term "Number Ratio" or "NR" is equal to $N_A/N_B$ where $N_A$ is the number (or moles) of atoms of a more numerous component A in a given nanoparticle or set of nanoparticles, and $N_B$ is the number (or moles) of atoms of a less numerous component B in the nanoparticle or set of nanoparticles. For a particular nanoparticle i, NR can be expressed as the specific value ($NR_i$). The average NR for all of the nanoparticles in a given set of nanoparticles is expressed as the average value ($NR_{avg}$).

In most cases, the individual NR values corresponding to the various particles within a given sample or set of nanoparticles do not equal a single discrete value but fall within a range of NR values (i.e., the "Range of NR"). The Range of NR for a given sample of set of nanoparticles having at least two different nanoparticle components within each particle has an upper value $NR_{max}$ and a lower value $NR_{min}$.

II. Multicomponent Nanoparticles

A. Nanoparticle Component Complexes

Nanoparticle component complexes include one or more different types of component atoms complexed with one or more different types of dispersing agents. When so complexed, the component atoms are arranged in such a manner that the components either (i) form dispersed nanoparticles in solution or (ii) that upon contact with a support, the component complexes form dispersed nanoparticles. In either case, the dispersing agent can form a component complex to produce nanoparticles that are dispersed, stable, uniform, and/or desirably sized.

1. Particle Atoms

Any two or more elements or groups of elements that can form catalysts or nanomaterials can be used to form particle complexes according to the present invention. As the primary component, metals or metal oxides are preferred. Exemplary metals can include base transition metals, noble metals, and rare earth metals. Nanoparticles may also comprise nonmetal atoms, alkali metals and alkaline earth metals. Where catalytic activity is desired, elements or groups of elements can be selected that exhibit primary catalytic activity, as well as promoters and modifiers.

Examples of base transition metals include, but are not limited to, chromium, manganese, iron, cobalt, nickel, copper, zirconium, tin, zinc, tungsten, titanium, molybdenum, vanadium, and the like. These can be used in various combinations with each other, and/or in combinations with other different and/or dissimilar metals such as noble metals, alkali metals, alkaline earth metals, rare earth metals, or non-metals.

Molecules such as ceramics and metal oxides can also be used in the nanoparticles of the present invention. Examples include iron oxide, vanadium oxide, aluminum oxide, silica, titania, yttria, zinc oxide, zirconia, cerium oxide, and the like.

Examples of noble metals, also referred to as precious metals, include platinum, palladium, iridium, gold, osmium, ruthenium, rhodium, rhenium, and the like. Noble metals can be used in combination with other different and/or dissimilar elements, such as base transition metals, alkali metals, alkaline earth metals, rare earth metals, or non-metals.

Examples of rare earth metals include, but are not limited to, lanthanum and cerium. These can be used alone, in various combinations with each other, and/or in combinations with other different and/or dissimilar elements, such as base transition metals, noble metals, alkali metals, alkaline earth metals, or non-metals.

Examples of non-metals include, but are not limited to, phosphorus, oxygen, sulfur and halides, such as chlorine, bromine and fluorine. These are typically included as functionalizing agents for one or more metals, such as those listed above.

When added to an appropriate solvent or carrier to form a suspension, as described below, particle atoms can be added as the elements themselves; however, the particle atoms are typically in ionic form so as to more readily dissolve or disperse within the solvent or carrier. For example, metal components can be added in the form of salts or other compounds. Components that are compounds themselves, such as oxides, can be added to a liquid medium in the appropriate compound form, or may be in a different chemical form that is converted to the appropriate chemical form during nanoparticle formation. In the case of a metallic component, the atoms may be in the form of a metal halide, nitrate or other appropriate salt that is readily soluble in the solvent or carrier, e.g., metal phosphates, sulfates, tungstates, acetates, citrates, or glycolates.

2. Dissimilar Components

In an exemplary embodiment, the nanoparticles of the present invention include two or more dissimilar components. Two components are dissimilar where their electronic configuration creates like-component attractions that, absent a dispersing agent according to the present invention, significantly affect or dominate the thermodynamics of particle formation and/or arrangement. For example, iron is generally dissimilar from platinum. When forming nanoparticles of platinum and iron using known methods, most if not all of the platinum atoms form particles with other platinum atoms and most if not all of the iron atoms form particles with other iron atoms. Absent a dispersing agent according to the present invention, the dissimilarity of iron and platinum atoms creates like-component attractions that predominate over other thermodynamic forces during particle formation or arrangement.

In one embodiment, the dissimilar components are components selected from different members of the group consisting of noble metals, base transition metals, alkali earth metals, rare earth metals, and non metals. In alternative embodiment, dissimilar components are selected from different groups of the periodic table of elements (i.e. different columns of the periodic table). Components selected from different groups of the periodic table are often dissimilar because of the difference in the number of valence electrons. As a non-limiting example of components formed from different groups of the periodic table, uniform nanoparticles may be composed of a mixture of titania and zinc oxide.

In yet another embodiment, the dissimilar metals are different base transition metals. Although categorized together, different base transition metals often exhibit dissimilar properties. These dissimilarities often create like-component attractions, which make different base transition metals difficult to combine or alloy in a dispersed manner. Likewise metal oxides can be difficult to combine or alloy as well. Those skilled in the art are familiar with atoms and molecules that are difficult or impossible to combine or alloy due to dissimilarities in the two components.

3. Dispersing Agents

A dispersing agent is selected to promote the formation of multicomponent nanoparticles that have a desired composition or distribution. Dispersing agents within the scope of the invention include a variety of organic molecules, polymers and oligomers. The dispersing agent comprises individual molecules that mediate in the formation of the dispersed nanoparticles.

In general, useful dispersing agents include organic compounds that can form particle complexes within compositions that include the dispersing agent, particle atoms, an appropriate solvent or carrier, and optional promoters or support materials. The dispersing agent is able to interact and complex with particle atoms dissolved or dispersed within an appropriate solvent or carrier through various mechanisms, including ionic bonding, covalent bonding, van der Waals interaction, hydrogen bonding, or coordination bonding involving non-bonding electron pairs.

To provide the interaction between the dispersing agent and the particle atoms, the dispersing agent includes one or more appropriate functional groups. In one embodiment, the functional groups comprise a carbon atom bonded to at least one electron-rich atom that is more electronegative than the carbon atom and that is able to donate one or more electrons so as to form a bond or attraction with a catalyst atom. Preferred dispersing agents include functional groups which have either a negative charge or one or more lone pairs of electrons that can be used to complex a catalyst atom. These functional groups allow the dispersing agent to have a strong binding interaction with dissolved particle atoms, which are preferably in the form of positively charged ions in solution.

The dispersing agent may be a natural or synthetic compound. In the case where the nanoparticle atoms are metals and the dispersing agent is an organic compound, the complex so formed is an organometallic complex.

In one embodiment, the functional groups of the dispersing agent comprise carboxyl groups either alone or in combination with other types of functional groups. In other embodiments, the functional groups may include one or more of hydroxyl, ester, ketone, aldehyde, amine, or amide groups, and combinations thereof. Examples of suitable dispersing agents include glycolic acid, oxalic acid, malic acid, citric acids, pectins, amino acids, celluloses, and combinations of these and salts of any of these.

Other dispersing agents that can be useful in present invention include polymers and oligomers or compounds. The dispersing agent can also be an inorganic compound (e.g., silicon-based) or a salt of the abovementioned polymers or oligomers.

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

It may be advantageous to provide an excess of the dispersing agent so as to provide an excess of functional groups relative to the number of particle atoms. Including an excess of functional groups helps ensure that all or substantially all of the particle atoms are complexed by the dispersing agent, which is particularly beneficial in the case where at least one of the nanoparticle components is expensive, such as in the case of noble metals. Providing an excess of dispersing agent can also help ensure the availability of functional groups for bonding the nanoparticle complex to a support where a supported nanoparticle is desired. It is also believed that employing an excess of functional groups helps yield nanoparticles that are more evenly dispersed. Excess dispersing agent molecules are believed to intervene and maintain spacing between dispersing agent molecules. The excess dispersing agent molecules can maintain spacing in a suspension as well as aid in spacing nanoparticles upon deposition to a support surface.

In addition to the characteristics of the dispersing agent, it can also be advantageous to control the molar ratio of dispersing agent to the particle atoms in a nanoparticle suspension. In one embodiment, the molar ratio of dispersing agent molecules to particle atoms is in the range of about 1:0.1 to about 1:10. Preferably, the molar ratio of dispersing agent molecules to particle atoms is in a range of about 1:0.2 to about 1:5.

In some cases, a more useful measurement is the molar ratio between dispersing agent functional groups and particle atoms. For example, in the case of a divalent metal ion two molar equivalents of a monovalent functional group would be necessary to provide the theoretical stoichiometric ratio. It may be desirable to provide an excess of dispersing agent functional groups to (1) ensure that all or substantially all of the particle atoms are complexed, (2) bond the nanoparticles to a support, and (3) help keep the nanoparticles segregated so that they do not clump or agglomerate together. In general, it will be preferable to include a molar ratio of dispersing agent functional groups to particle atoms in a range of about 0.5:1 to about 40:1, more preferably in a range of about 1:1 to about 35:1, and most preferably in a range of about 3:1 to about 30:1.

As discussed below, the nanoparticles can be supported on a support surface. It is believed that when a support material is added to a suspension of catalyst particles the dispersing agent acts to uniformly disperse the complexed particle atoms and/or suspended nanoparticles onto the support material.

Finally, depending on the desired stability of the nanoparticles, the dispersing agent can be selected such that it acts as an anchor between the nanoparticles and a support material, which is described more fully below. During and after formation of the nanoparticles, the dispersing agent can act as an anchoring agent to secure the nanoparticle to a substrate. Preferably, the substrate has a plurality of hydroxyl or other functional groups on the surface thereof which are able to chemically bond to one or more functional groups of the dispersing agent, such as by a condensation reaction. One or more additional functional groups of the dispersing agent are also bonded to one or more atoms within the nanoparticle, thereby anchoring the nanoparticle to the substrate.

While the dispersing agent has the ability to inhibit agglomeration without anchoring, chemically bonding the nanoparticle to the substrate surface through the dispersing agent is an additional and particularly effective mechanism for preventing agglomeration.

B. Solvents and Carriers

A solvent or carrier may be used as a vehicle for the particle atoms (typically in the form of an ionic salt) and/or the dispersing agent. The solvent used to make inventive precursor compositions may be an organic solvent, water or a combination thereof. Organic solvents that can be used include alcohols, ethers, glycols, ketones, aldehydes, nitriles, and the like.

Preferred solvents are liquids with sufficient polarity to dissolve the metal salts. These preferred solvents include water, methanol, ethanol, normal and isopropanol, acetonitrile, acetone, tetrahydrofuran, ethylene glycol, dimethylformamide, dimethylsulfoxide, methylene chloride, and the like, including mixtures thereof.

Other chemical modifiers may also be included in the liquid mixture. For example, acids or bases may be added to adjust the pH of the mixture. Surfactants may be added to adjust the surface tension of the mixture, or to stabilize the nanoparticles.

The solvent for the nanoparticle components may be neat solvent, but it is preferable to use an acidic solution, as acids aid in the dissolution of the nanoparticle components. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations, it is generally only necessary to use relatively dilute solutions to accomplish the desired solubility enhancement. Moreover, concentrated acid solutions may present added hazard and expense. Thus, dilute acid solutions are currently preferred.

C. Supports and Support Materials

The nanoparticles can be isolated on a support surface. In an exemplary embodiment, the nanoparticles are formed on a separate solid support. The solid support material may be organic or inorganic. Typically a support is used for nanoparticles that are to be used as a catalyst. For a catalyst support, the support can be chemically inert in the chemical reaction environment or the solid support itself may serve a catalytic function complimentary to the function or the catalyst particles of the present invention.

Any solid support material known to those skilled in the art as useful nanoparticle supports can be used as supports for the dispersed nanoparticles of this invention. These supports may be in a variety of physical forms. They may be either porous or non-porous. They may be 3-dimensional structures such as a powder, granule, tablet, extrudates, or other 3-dimensional structure. Supports may also be in the form of 2-dimensional structures such as films, membranes, coatings, or other mainly 2-dimensional structures.

A variety of other materials, alone or in combination, can comprise the support. One important class of support materials which is preferred for some applications is porous inorganic materials. These include, but are not limited to, alumina, silica, silica gel, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures.

Another useful class of supports preferred for some applications include carbon-based materials, such as carbon black, activated carbon, graphite, fluoridated carbon, and the like. Other useful classes of support materials include organic solids, such as polymers and metals and metal alloys.

In the case where the nanoparticles are attached to a support, the nanoparticles can be deposited in a wide range of loadings on the support material. The loading can range from 0.01% to 90% by weight of the total weight of the supported nanoparticles. The preferred loading will depend on the application. In the case where porous solids are used as the support material, it is preferred that the surface area of the support be at least 20 m$^2$/g, and more preferably more than 50 m$^2$/g.

D. Distribution of Components Within the Nanoparticles

At least a portion of the nanoparticles within a preparation of nanoparticles manufactured according to the invention will include two or more (e.g., both) of the nanoparticle components. In a preferred embodiment, at least about 50% of the nanoparticles include two or more of the nanoparticle components. More preferably, at least about 75% of the nanoparticles within the preparation include two or more of the nanoparticle components, even more preferably at least about 85% of the nanoparticles within the preparation include two or more of the nanoparticle components, and most preferably at least about 95% of the nanoparticles within the preparation include two or more of the nanoparticle components. It is within the scope of the invention for at least about 99% of the nanoparticles within a preparation according to the invention to include two or more of the nanoparticle components.

Because a substantial proportion of the nanoparticles prepared according to the invention include two or more nanoparticle components, the benefits derived from having the components in a single particle are more uniformly distributed throughout the nanoparticles compared to heterogeneous mixtures of homogeneous particles. Consequently, the overall nanomaterial or catalyst has an increased display of these beneficial properties.

According to another aspect of the invention, the degree of dispersion of the two or more components within nanoparticles prepared according to the invention can be measured by the Number Ratio (NR) or Range of NR for a given set of nanoparticles having two or more components. As mentioned above, the Number Ratio=$N_A/N_B$, where $N_A$ is the number (or moles) of atoms of a more numerous component A within a nanoparticle or set of nanoparticles according to the invention, and $N_B$ is the number (or moles) of atoms of a less numerous component B within the nanoparticle or set of nanoparticles. The value of NR can be expressed as an average value ($NR_{avg}$) for all of the nanoparticles in a given set or as the specific value ($NR_i$) for a particular nanoparticle i.

In an ideal case, the value $NR_i$ for each nanoparticle i in a given set of inventive nanoparticles equals $NR_{avg}$. In this case, each particle i has an equal distribution of components A and B. The present invention also contemplates controlling the dispersion of components in bi- or multi-component nanoparticles such that the Range of NR values for all of the nanoparticles in a particular sample is within a desired range. As mentioned above, the Range of NR has an upper value $NR_{max}$ and a lower value $NR_{min}$. As $NR_{max}$ and $NR_{i,min}$ deviate less from $NR_{avg}$, the Range of NR becomes narrower, which indicates that the nanoparticles are more uniform.

In a preferred embodiment, the value of $NR_{max}$ does not exceed about 5 times the value of $NR_{avg}$, more preferably does not exceed about 3 times the value of $NR_{avg}$, and most preferably does not exceed about 2 times the value of $NR_{avg}$.

Conversely, the value of $NR_{i,min}$ is preferably at least about 0.2 times the value of $NR_{avg}$, more preferably at least about 0.33 times the value of $NR_{avg}$, and most preferably at least about 0.5 times the value of $NR_{avg}$.

Given the foregoing, the Range of NR is therefore preferably about 0.2 to about 5 times the value of $NR_{avg}$, more preferably about 0.33 to about 3 times the value of $NR_{avg}$, and most preferably about 0.5 to about 2 times the value of $NR_{avg}$. It will be appreciated that the foregoing ranges do not count "outliers" (i.e., particles that do not form correctly and that excessively deviate from $NR_{avg}$ as to be outside the Range of NR). Whereas the NR of the "outliers" may in some cases count toward the $NR_{avg}$, they do not fall within the Range of NR by definition.

In a preferred embodiment, at least about 50% of the individual nanoparticles in a given preparation will have an $NR_i$ within the Range of NR. More preferably, at least about 75% of the individual nanoparticles within the preparation will have an $NR_i$ within the Range of NR, even more preferably at least about 85% of the individual nanoparticles within the preparation will have an $NR_i$ within the Range of NR, and most preferably at least about 95% of the individual nanoparticles within the preparation will have an $NR_i$ within the Range of NR. It is within the scope of the invention for at least about 99% of the individual nanoparticles within a preparation according to the invention to have an $NR_i$ within the Range of NR.

In contrast to the relatively narrow Range of NR for nanoparticles made according to the present invention, the nanoparticles in the prior art have very wide Ranges of $NR_i$, in some cases ranging from zero to infinity, indicating that some particles have essentially none of one component, and other particles have essentially none of the other component.

The following two simple numerical examples provide non-limiting examples of nanoparticles of the present invention having desired Ranges of NR. Consider a case where component B comprises 1% of a bimetallic nanoparticle mixture, and component A comprises the balance in a given set of nanoparticles. In this, case the $NR_{avg}$ for the set of nanoparticles is approximately 100. The preferred Range of NR for the set nanoparticles is thus 20 to 500, which translates to a range of 0.2% to 5% of component B in the individual nanoparticles that contain both components. The more preferred range for NR is 33 to 300, translating to a composition range of 0.33% to 3% of component B in the individual nanoparticles that contain both components. The most preferred range for $NR_i$ is 50 to 200, or a composition range of 0.5% to 2% component B in the individual nanoparticles that contain both components.

In a second simple numerical example, consider a case where component A and component B are each present in equal quantities of 50% of the total, such that the overall $NR_{avg}$ is 1. In this case, the preferred range of $NR_i$ is 0.2 to 5, corresponding to a composition range of 16% to 83% of component B in the individual nanoparticles that contain both components. The more preferred range of $NR_i$ is 0.33 to 3, corresponding to a composition range of 25% to 75% component B in the individual nanoparticles that contain both components. Finally, the most preferred range of $NR_i$ is 0.5 to 2, or a composition range of 33% to 67% component B in the individual nanoparticles that contain both components.

As discussed above, the dispersing agents of the present invention are used to provide the desired dispersion and uniformity that is characteristic of the nanoparticles of the present invention. Using the dispersing agents according to the present invention, the above-mentioned uniformity as defined by NR can be obtained.

In one embodiment, the dispersing agent remains as a constituent of the nanoparticles. The inventors of the present invention have found by infrared spectroscopy that characteristics features attributable to the dispersing agent can be present in the final nanoparticle product, indicating that the dispersing agent persists beyond the nanoparticle production steps. In one embodiment, the dispersing agent is believed to be a stabilizing component in the final catalyst or nanoparticle material. For example, the dispersing agent can provide a desirable anchoring effect of the particle to a support which prevents migration and agglomeration of nanoparticles, even under relatively severe operating conditions. However, even where the dispersing agent is not used as an anchor to a support material, the dispersing agent can have a stabilizing effect.

While it is possible that the multi-component nanoparticles may contain a true multicomponent compound or crystal structure containing all components, this is not required. In one embodiment, each nanoparticle can be composed of a mixture of components regardless of how they are chemically combined. The components can be present as relatively isolated atoms, or as small atomic clusters. They can also be present as amorphous particles. The components can also be present as crystallites including alloys. Component crystals can have relatively random crystal face exposures; or they can have a controlled or selective exposure of particular crystal faces.

The uniformity made possible by the dispersing agent of the present invention allows for catalyst and nanomaterials with new and/or improved material properties. Many multi-component catalyst and nanomaterial properties depend on the proximity of the two components. The substantially uniform distribution of components between nanoparticles provides a greater possibility for different components to come into proximity with one another to provide a desired functionality or property.

The dispersing agent also makes it possible to select very precise ratios of components by controlling the average percent composition. Because the individual multicomponent catalyst particles have a percent composition that varies very little from the average composition, the percent composition of the individual nanoparticles can be more precisely controlled by adjusting the starting materials to control the average percent composition.

III. Methods of Making Multicomponent Nanoparticles

The process for manufacturing nanoparticles can be broadly summarized as follows. First, one or more types of particle atoms and one or more types of dispersing agents are selected. Second, the particle atoms (i.e. components) and the dispersing agent are reacted or combined together to form component complexes. The component complex is generally formed by first dissolving the particle atoms and dispersing agent in an appropriate solvent or carrier in the form of ionic salts and then allowing the salts to recombine as the component complex so as to form a solution or suspension. In one embodiment, dispersed nanoparticles form in the suspension. In an alternative embodiment, the dispersing agent facilitates the formation of nanoparticles as the active atoms, which are thereafter disposed on a support surface in a third step. Fourth, if needed, a portion of the dispersing agent can be removed to expose the active atoms. At some point in this process, the dispersing agent may form a chemical bond with the support surface thereby in order to anchor the catalyst particles to the support.

In one aspect of the invention, the "nanoparticle" may be considered to be the component complex comprising the particle atoms and dispersing agent, exclusive of the surrounding solvent or carrier. Indeed, it is within the scope of the invention to create a component complex in solution, or as a colloid or suspension, and then remove the solvent or carrier so as to yield a dried component complex. The dried component complex can be used in such a form, or can be used later by adding an appropriate solvent or carrier to reconstitute a solution or suspension containing the component complex.

Exemplary methods for making nanoparticles according to the present invention include providing one or more types of particle atoms in solution (e.g., in the form of an ionic salt), providing a dispersing agent in solution (e.g., in the form of a carboxylic acid salt), and reacting the particle atoms with the dispersing agent to form a suspension of complexed particle atoms and dispersing agent. The fine dispersion of the nanoparticle components within an appropriate solvent or carrier by the dispersing agent may be colloidal.

The particle atoms can be provided in any form so as to be soluble or dispersible in the solvent or carrier that is used to form the component complex. In the case where the particle atoms comprise one or more metals, salts of these metals can be formed that are readily soluble in the solvent or carrier. In the case where the particle atoms include noble metals, it may be advantageous to use noble metal chlorides and nitrates, since chlorides and nitrate of noble metals are more readily soluble than other salts. Chlorides and nitrates of other metal particle atoms, such as base transition metals and rare earth metals may likewise be used since chlorides and nitrates are typically more soluble than other types of salts.

These particle atoms can be added to the solvent or carrier singly or in combination to provide final nanoparticles that comprise mixtures of various types of particle atoms. For example, a bimetallic iron/platinum catalyst can be formed by first forming a precursor solution into which is dissolved an iron salt, such as iron chloride, and a platinum salt, such as chloroplatinic acid. In general, the composition of the final nanoparticles will be determined by the types of particle atoms added to the precursor solution. Therefore, control of the amounts of precursor salts added to the solution provides a convenient method to control the relative concentrations of different types of particle atoms in the final nanoparticles.

The dispersing agent is added to the solvent or carrier in a manner so as to facilitate association with the particle atoms in order to form the component complex. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex, which may be soluble or which may form a colloidal suspension within the solvent or carrier.

One aspect of the invention is that very small nanoparticles can be controllably formed. The inventors believe that the use of an excess quantity of the dispersing agent plays a factor in determining the size of the resulting catalyst particles.

In the case where the nanoparticles of the invention are to be formed on a solid support material, the component complex solution is physically contacted with the solid support. Contacting the component complex with the solid support is typically accomplished by means of an appropriate solvent or carrier within the component complex solution in order to apply or impregnate the component complex onto the support surface.

Depending on the physical form of the solid support, the process of contacting or applying the component complex to the support may be accomplished by a variety of methods. For example, the support may be submerged or dipped into a solution or suspension comprising a solvent or carrier and the component complex. Alternatively, the solution or suspension may be sprayed, poured, painted, or otherwise applied to the support. Thereafter, the solvent or carrier is removed, optionally in connection with a reaction step that causes the dispersing agent to become chemically bonded or adhered to the support.

If needed, a portion of the particle atoms can be exposed by removing a portion of the dispersing agent such as by reduction (e.g., hydrogenation) or oxidation. Hydrogen is one preferred reducing agent. Instead of, or in addition to, using hydrogen as the reducing agent, a variety of other reducing agents may be used, including lithium aluminum hydride, sodium hydride, sodium borohydride, sodium bisulfite, sodium thiosulfate, hydroquinone, methanol, aldehydes, and the like. The reduction process may be conducted at a temperature between 20° C. and 500° C., and preferably between 100° C. and 400° C. It should be pointed out that oxidation is more suitable when the particle atoms do not include noble metals, since noble metals might catalyze the oxidation of the entire dispersing agent, leaving none for anchoring. Oxidation is more suitable (e.g., at a maximum temperature of 150° C.), for example, in the case where the particle atoms comprise transition metals and the support is non-combustible (e.g., silica or alumina rather than carbon black, graphite or polymer membranes).

The process of removing the dispersing agent to expose the particle atoms is carefully controlled to ensure that enough of the dispersing agent remains so as to reliably maintain a dispersed catalyst. Removing the dispersing agent to the extent that little or none of it remains to disperse or anchor the nanoparticles has been found to reduce the stability of the nanoparticles, particularly when the catalyst is subjected to harsh reaction conditions during use.

Supported nanoparticles can be optionally heat-treated to further activate the nanoparticles. It has been found that, in some cases, subjecting the nanoparticles to a heat treatment process before initially using the nanoparticles causes the nanoparticles to be more active initially. The step of heat treating the nanoparticles may be referred to as "calcining" because it may act to volatilize certain components within the nanoparticles. The heat treatment process may be carried in inert, oxidizing, or reducing atmospheres, but preferably in an inert atmosphere.

Where the nanoparticles are subjected to a heat treatment process, the process is preferably carried out at a temperature in a range of about 50° C. to about 300° C., more preferably in a range of about 100° C. to about 250° C., and most preferably in a range of about 125° C. to about 200° C. The duration of the heat treatment process is preferably in a range of about 30 minutes to about 12 hours, more preferably in a range of about 1 hour to about 5 hours.

One important feature of the heat treating step according to the present invention is that it does not degrade the nanoparticles or reduce catalytic activity. The dispersing agent provides the stability need to subject the nanoparticles to higher temperatures without destroying or partially destroying the nanoparticles.

The following exemplary procedures where used to prepare iron-platinum multicomponent nanoparticles.

EXAMPLE 1

Nanoparticle Suspension

An Iron (III) solution was prepared by dissolving 2.32 g of $FeCl_3$ in 4 ml HCl and 996 ml de-ionized water to produce a 0.08 wt % solution of Fe (III). A Pt solution was prepared by dissolving 0.2614 g $H_2PtCl_6$ (from Strem Chemicals) in 1000 ml de-ionized water to make 0.01 wt % solution of Pt. To make a 6.75 wt % solution of polyacrylate, 15 g of a 45 wt % poly acrylate solution (Aldrich with MW ca. 1,200) was diluted to 100 grams with de-ionized water.

To prepare 2.4 grams of a 10% Fe+0.2% Pt supported catalyst, 300 ml of the 0.08 wt % Fe solution was mixed with 48 ml of the 0.010 wt % Pt solution and 40 ml of the 6.75 wt % polyacrylate solution. The ratio of Fe:polyacrylate was 1:1. The solution was then diluted to 4000 ml with de-ionized water. This solution was purged by 100 ml/min $N_2$ for 1 h. Then $N_2$ was replaced by 130 ml/min $H_2$ for 16 minutes. The flask was then held overnight. The Fe—Pt solution resulted in a suspension of nanoparticles

EXAMPLE 2

Supported nanoparticles were prepared by first preparing a solution of Fe—Pt particles according to Example 1. 24 g of Black Pearls 700 were impregnated by 4000 ml of the Fe—Pt solution prepared according to Example 1. The slurry was heated by IR lamp under rotation until all the liquid was evaporated. The obtained samples were kept in an oven at 100 degree C. The sample was packed in a reduction unit between two layers of glass-wool. The sample was then treated by the following procedure: Purged by 100 ml/min $N_2$ for 15 minute. Purged with 100 ml/min $H_2$ at the following temperatures and for the following amount of time: 25° C. (0.5 h) then 90° C. (2 h) then 90° C. (2 h) then 300° C. (17 h). The reactor out was taken from the sand bath and cooled to room temperature in 100 ml/min $H_2$. Purged by 100 ml/min $N_2$ for one hour.

EXAMPLE 3

8.13 g $FeCl_3$ was mixed with 16.5 g 70 wt % glycolic acid and diluted with water to 100 g. After overnight agitation, the $FeCl_3$ was totally dissolved. To this solution 2.8 g 0.01 wt % Pt solution from Example 1 was added. This solution was used to impregnate 140 g $CaCO_3$. After the same drying and activation procedure as for Example 1, an alloy sample with 2% Fe and 0.02% Pt was formed.

The multicomponent nanoparticle materials produced in examples 1, 2, and 3 had nanoparticles where essentially all the nanoparticles included both iron and platinum, which would be thermodynamically impossible using heat compounding techniques.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multicomponent nanoparticle containing material, comprising:

a plurality of nanoparticles having a size less than about 100 nm on a support material, the plurality of nanoparticles comprising, a plurality of at least two dissimilar metal nanoparticle components, the metal nanoparticle components being selected from at least two different groups of the periodic table of elements; and wherein at least a portion of the plurality of nanoparticle components are bound to a multi-functional dispersing agent and have an arrangement determined at least in part by the multi-functional dispersing agent such that at least about 50% of the nanoparticles are multicomponent nanoparticles that include two or more different nanoparticle components within each multicomponent nanoparticle and so that the multicomponent nanoparticles form a Range of NR, excluding outliers, that is about 0.2 to about 5 times the value of $NR_{avg}$, the multi-functional dispersing agent including individual molecules having at least two functional groups selected from the group consisting of functional groups having a negative charge and functional groups having one or more lone pairs of electrons;

wherein the nanoparticles are formed using an intermediate component complex obtained by reacting together functional groups of the multi-functional dispersing agent and individual ions of the metal nanoparticle components, wherein the multi-functional dispersing agent comprises at least one member selected from the group consisting of glycolic acid, oxalic acid, malic acid, citric acid, pectins, amino acids, celluloses, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, and polypropylene glycol, wherein the multifunctional dispersing agent binds the plurality of nanoparticles to the support material, which helps prevent agglomeration of the nanoparticles.

2. A multicomponent nanoparticle containing material according to claim 1, wherein at least about 95% of the nanoparticles are multicomponent nanoparticles that include two or more different nanoparticle components within each multicomponent nanoparticle.

3. A multicomponent nanoparticle containing material according to claim 1, wherein the multicomponent nanoparticles form a Range of NR, excluding outliers, that is about 0.33 to about 3 times the value of $NR_{avg}$.

4. A multicomponent nanoparticle containing material according to claim 1, wherein the multicomponent nanoparticles form a Range of NR, excluding outliers, that is about 0.5 to about 2 times the value of $NR_{avg}$.

5. A multicomponent nanoparticle containing material, comprising:
    a support material; and
    a plurality of multicomponent nanoparticles on the support material having a size less than about 100 nm, the plurality of multicomponent nanoparticles comprising:
        at least two dissimilar nanoparticle components within each of the multicomponent nanoparticles, one of the dissimilar nanoparticle components being selected from one member of the group consisting of noble metals, base transition metals, alkali earth metals, and rare earth metals and at least one other of the dissimilar nanoparticle compositions being selected from another member of the group consisting of noble metals, base transition metals, alkali earth metals, and rare earth metals;
    wherein at least a portion of the nanoparticle components are bound to a multi-functional dispersing agent and have an arrangement determined at least in part by the multi-functional dispersing agent, the multi-functional dispersing agent including individual molecules having at least two functional groups selected from the group consisting of functional groups having a negative charge and functional groups having one or more lone pairs of electrons;
    wherein the nanoparticles are formed using an intermediate component complex obtained by reacting together functional groups of the multi-functional dispersing agent and individual atoms of the dissimilar nanoparticle components in order for the multi-functional dispersing agent to at least in part determine the arrangement of the nanoparticle components within the multicomponent nanoparticle;
    wherein the dispersing agent binds the plurality of multicomponent nanoparticles to the support material wherein the multi-functional dispersing agent comprises at least one member of the group consisting of glycolic acid, oxalic acid, malic acid, citric acid, pectins, amino acids, celluloses, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephtalate, polyvinyl alcohol, polyethylene glycol, and polypropylene glycol.

6. A multicomponent nanoparticle containing material according to claim 5, wherein the multicomponent nanoparticles make up at least about 75% of total nanoparticles in the multicomponent nanoparticle material.

7. A multicomponent nanoparticle material containing according to claim 5, wherein the multicomponent nanoparticles make up at least about 85% of total nanoparticles in the multicomponent nanoparticle material.

8. A multicomponent nanoparticle containing material according to claim 5, wherein the multicomponent nanoparticles make up at least about 95% of total nanoparticles in the multicomponent nanoparticle material.

9. A multicomponent nanoparticle containing material according to claim 5, wherein the multicomponent nanoparticles make up at least about 99% of total nanoparticles in the multicomponent nanoparticle material.

10. A multicomponent nanoparticle containing material according to claim 5, wherein the multicomponent nanoparticles form a Range of NR, excluding outliers, that is about 0.2 to about 5 times the value of $NR_{avg}$.

11. A multicomponent nanoparticle containing material according to claim 5, wherein the multicomponent nanoparticles form a Range of NR, excluding outliers, that is about 0.33 to about 3 times the value of $NR_{avg}$.

12. A multicomponent nanoparticle containing material according to claim 5, wherein the multicomponent nanoparticles form a Range of NR, excluding outliers, that is about 0.5 to about 2 times the value of $NR_{avg}$.

13. A multicomponent nanoparticle containing material as in claim 5, wherein the at least two dissimilar components within the multicomponent nanoparticles are alloyed.

14. A multicomponent nanoparticle containing material as in claim 5, wherein the at least two dissimilar components are selected from the group of component combinations comprising noble metal-base transition metal, metal oxide-noble metal, metal oxide-metal oxide.

15. A multicomponent nanoparticle containing material as in claim 5, wherein at least one of the nanoparticle components comprises a base transition metal.

16. A multicomponent nanoparticle containing material as in claim 15, wherein the base transition metal comprises iron.

17. A multicomponent nanoparticle containing material as in claim 5, wherein the size of the multicomponent nanoparticles is less than about 20 nm.

18. A multicomponent nanoparticle containing material as in claim 5, wherein the size of the multicomponent nanoparticles is less than about 6 nm.

19. A multicomponent nanoparticle containing material as in claim 5, wherein the size of the multicomponent nanoparticles is less than about 4 nm.

20. A multicomponent nanoparticle containing material as in claim 5, wherein the multicomponent nanoparticles are catalytically active.

* * * * *

UNITED STATES PATENT AND TRADEMARK OFFICE
CERTIFICATE OF CORRECTION

PATENT NO. : 7,632,775 B2 Page 1 of 2
APPLICATION NO. : 10/990616
DATED : December 15, 2009
INVENTOR(S) : Zhou et al.

It is certified that error appears in the above-identified patent and that said Letters Patent is hereby corrected as shown below:

Title page, Left Column, under item [56]
U.S. Patent 4,379,778 A, change "Dalton Jr." to --Dalton, Jr.--

Title page, item [57] Right Column
Abstract, Line 5, change "poly functional" to --poly-functional--

Page 2, Right Column, under item [57]
U.S. Patent 6,888,013 B2, change "Paparato" to --Paparatto--

Page 3, Left Column, under Other Publication
Duplicate reference, delete "Zhou, et al. "Preparation and Characterization of Anode Catalysts PtRu/C for Direct Methanol Fuel Cells", *Chemical Journal of Chinese Universities*, vol. 24, No. 5, pp. 858-862."

Column 2
Line 2, change "causes" to --cause--
Line 55, change "muiticomponent" to --multicomponent--

Column 5
Line 60, change "embodiment" to --embodiments--

Column 6
Line 55, change "in" to --in the--
Line 58, change "abovementioned" to --above-mentioned--

Column 10
Lines 58-59, change "characteristics" to --characteristic--

Signed and Sealed this

First Day of June, 2010

David J. Kappos
*Director of the United States Patent and Trademark Office*

Column 13
Line 46, change "need" to --needed--
Line 49, change "where" to --were--
Line 62, change "poly acrylate" to --polyacrylate--

Column 14
Lines 14-15, change "100 degree" to --100°--

UNITED STATES PATENT AND TRADEMARK OFFICE
CERTIFICATE OF CORRECTION

PATENT NO.       : 7,632,775 B2
APPLICATION NO.  : 10/990616
DATED            : December 15, 2009
INVENTOR(S)      : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Second Day of November, 2010

David J. Kappos
*Director of the United States Patent and Trademark Office*